United States Patent
Schumacher et al.

(10) Patent No.: US 9,846,449 B1
(45) Date of Patent: Dec. 19, 2017

(54) SYSTEM AND METHOD FOR MONITORING BUS TRANSACTIONS WITHIN A PROGRAMMABLE INTEGRATED CIRCUIT BY SELECTIVELY INSERTING DETECTOR CIRCUIT AT USER SPECIFIED INSERTION POINT CORRESPONDING TO A BUS INTERCONNECT

(71) Applicant: Xilinx, Inc., San Jose, CA (US)

(72) Inventors: Paul R. Schumacher, Berthoud, CO (US); Graham F. Schelle, Longmont, CO (US); Bradley K. Fross, Boulder, CO (US)

(73) Assignee: XILINX, INC., San Jose, CA (US)

(*) Notice: Subject to any disclaimer, the term of this patent is extended or adjusted under 35 U.S.C. 154(b) by 522 days.

(21) Appl. No.: 14/322,411

(22) Filed: Jul. 2, 2014

(51) Int. Cl.
  *G06F 1/04* (2006.01)
  *G06F 1/14* (2006.01)

(52) U.S. Cl.
  CPC ..................... *G06F 1/04* (2013.01)

(58) Field of Classification Search
  CPC ............ G06F 2201/86; G06F 11/348; G06F 2201/88; G06F 11/349; G06F 1/3203; G06F 11/3409; G06F 12/0831; G06F 13/4027; G06F 11/3452; G06F 2201/87; G06F 11/364; G06F 11/3027
  See application file for complete search history.

(56) References Cited

U.S. PATENT DOCUMENTS

| | | | | |
|---|---|---|---|---|
| 5,426,741 A | * | 6/1995 | Butts, Jr. | G06F 11/348 710/18 |
| 5,774,700 A | * | 6/1998 | Fisch | G06F 12/0831 711/146 |
| 6,384,627 B1 | | 5/2002 | Fross et al. | |
| 6,460,107 B1 | * | 10/2002 | Rao | G06F 11/3409 710/305 |
| 6,470,223 B1 | * | 10/2002 | Naganuma | G05B 19/052 700/23 |

(Continued)

OTHER PUBLICATIONS

Specification and drawings for U.S. Appl. No. 13/398,790, filed Feb. 16, 2012, Schumacher et al.

(Continued)

*Primary Examiner* — Thomas Lee
*Assistant Examiner* — Zhipeng Wang
(74) *Attorney, Agent, or Firm* — Kevin T. Cuenot

(57) ABSTRACT

An integrated circuit including a universal monitor system includes a detector circuit. The detector circuit includes a start trigger circuit receiving first signals, an end trigger circuit receiving second signals, and a latency circuit coupled to outputs of the start and end trigger circuits. The start trigger circuit detects a start event from the first signals. The end trigger circuit detects an end event from the second signals. The detector circuit further includes: a data trigger circuit receiving third signals and detecting transferred data therefrom; a first counter circuit coupled to the latency circuit and calculating a total latency; a second counter circuit coupled to at least one of the start trigger circuit and counting start events, or the end trigger circuit and counting end events; and a third counter circuit coupled to an output of the data trigger circuit and counting a total amount of data transferred.

20 Claims, 10 Drawing Sheets

(56) References Cited

U.S. PATENT DOCUMENTS

| | | | | |
|---|---|---|---|---|
| 6,526,370 B1* | 2/2003 | Yu | ............... | G06F 11/3409 |
| | | | | 702/176 |
| 6,789,182 B1* | 9/2004 | Brothers | ............ | G06F 11/3476 |
| | | | | 712/227 |
| 7,051,131 B1* | 5/2006 | Wiedenman | .......... | G06F 11/349 |
| | | | | 710/105 |
| 9,396,145 B1* | 7/2016 | Chu | ................ | G06F 13/36 |
| 2004/0237003 A1* | 11/2004 | Adkisson | ............ | G06F 11/348 |
| | | | | 714/47.2 |
| 2005/0240828 A1* | 10/2005 | Rothman | ............ | G06F 11/3485 |
| | | | | 714/43 |
| 2007/0005852 A1* | 1/2007 | Armstead | ........... | G06F 11/3476 |
| | | | | 710/100 |
| 2010/0088451 A1* | 4/2010 | Kageshima | ............ | G06F 13/28 |
| | | | | 710/305 |
| 2012/0226839 A1* | 9/2012 | Fuoco | ................ | G06F 11/3636 |
| | | | | 710/110 |
| 2014/0052929 A1* | 2/2014 | Gulati | ................ | G06F 12/0815 |
| | | | | 711/141 |

OTHER PUBLICATIONS

Specification and drawings for U.S. Appl. No. 13/791,642, filed Mar. 8, 2013, Ramineni et al.

\* cited by examiner

SYSTEM AND METHOD FOR MONITORING BUS TRANSACTIONS WITHIN A PROGRAMMABLE INTEGRATED CIRCUIT BY SELECTIVELY INSERTING DETECTOR CIRCUIT AT USER SPECIFIED INSERTION POINT CORRESPONDING TO A BUS INTERCONNECT

TECHNICAL FIELD

This disclosure relates to integrated circuits (ICs) and, more particularly, to a universal monitor system for an IC.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Determining the performance of an electronic system implemented within an IC having a complex architecture as described above is highly desirable. One technique for determining the performance of such an electronic system is to monitor transactions occurring on interconnects within the electronic system. Specialized monitor circuitry is often incorporated into the IC as part of the electronic system implemented therein. The monitor circuitry may be used to detect particular events that occur on one or more interconnects of the IC.

Interconnect transactions, interconnect events, and inter-module connections, however, tend to be specific to the particular type of interconnect that is monitored. Each different type of interconnect requires a custom, or interconnect-specific, monitor solution if monitoring is desired. For each different type of interconnect to be monitored, for example, the interconnect-specific monitor solution must be operable with the inter-module connections of the interconnect and be able to detect transactions and events specific to the interconnect. Creating a customized interconnect monitoring solution for each different type of interconnect that may be used within an electronic system often requires significant time and development effort.

SUMMARY

An integrated circuit (IC) includes a universal monitor system having a first detector circuit. The first detector circuit includes a start trigger circuit receiving first signals of an interconnect, wherein the start trigger circuit detects a start event for a transaction from the first signals, an end trigger circuit receiving second signals of the interconnect, wherein the end trigger circuit detects an end event for the transaction from the second signals. The first detector circuit further includes a latency circuit coupled to an output of the start trigger circuit and an output of the end trigger circuit. The first detector circuit also includes a data trigger circuit receiving third signals of the interconnect and detecting transferred data from the third signals. The first detector circuit further includes: a first counter circuit coupled to an output of the latency circuit and calculating a total latency; a second counter circuit coupled to an output of at least one of the start trigger circuit and counting start events, or the end trigger circuit and counting end events; and a third counter circuit coupled to an output of the data trigger circuit and counting a total amount of data transferred.

A method of monitoring an interconnect within an IC includes detecting start events for transactions on the interconnect using a first trigger circuit, detecting end events for the transactions using a second trigger circuit, and determining a total latency of transactions according to the detected start events and the detected end events. The method further includes detecting transferred data segments on the interconnect using a third trigger circuit and determining an amount of data transferred according to the transferred data segments. The method also includes storing the amount of data transferred and the total latency within a plurality of memory mapped registers of a target controller.

An IC includes a universal monitor system. The universal monitor system includes a first detector circuit coupled to an interconnect. The first detector circuit includes a first plurality of circuit blocks that process events of transactions of a first type. The first plurality of circuit blocks include a first plurality of programmable event trigger circuits coupled to a first plurality of counters including a first total latency counter, a first number of transactions counter, and a first total bytes transferred counter. The universal monitor system includes a second detector circuit coupled to the interconnect. The second detector circuit includes a second plurality of circuit blocks that process events of transactions of a second type. The second plurality of circuit blocks include a second plurality of programmable event trigger circuits coupled to a second plurality of counters including a second total latency counter, a second number of transactions counter, and a second total bytes transferred counter.

DETAILED DESCRIPTION

Figure 1:
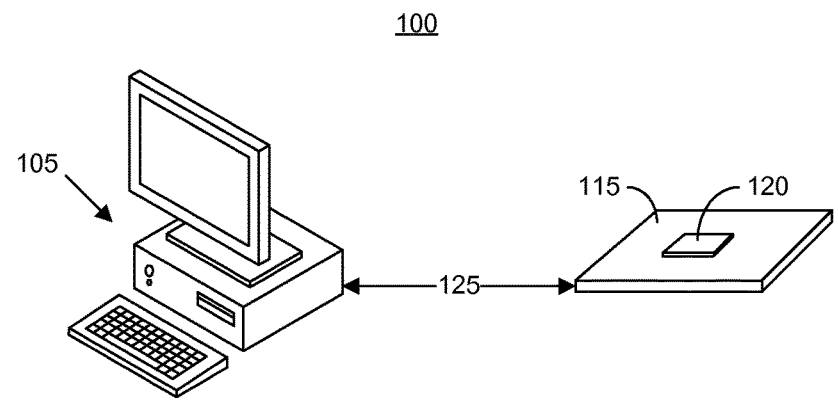
FIG. 1 is a block diagram illustrating an exemplary circuit design and test environment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a universal monitor system for an IC. In accordance with the inventive arrangements described herein, a universal monitor system is disclosed. The universal monitor system may be implemented to monitor one or more interconnects of different types used within an IC. As defined herein, the term "interconnect" means circuitry, e.g., one or more wires, used to transfer data between two or more components or circuit blocks within an integrated circuit. Examples of an interconnect include, but are not limited to, a net, a bus, a packet switched network, a full crossbar switch, or the like.

In one aspect, the universal monitor system includes one or more universal monitor circuits coupled to a target controller within the IC. Each universal monitor circuit may include at least one detection circuit. Each detection circuit may include a plurality of trigger circuits. The trigger circuits detect particular events on an interconnect to which the trigger circuits are attached. The trigger circuits may be configured to detect particular events prior to implementation within the IC or subsequent to implementation within the IC, e.g., during runtime. A user, for example, may specify the particular signals of an interconnect to be monitored by each trigger circuit and the particular state of each such monitored signal, thereby defining the events that are detected on the interconnect by the trigger circuits.

Event data generated by each universal monitor circuit is provided to the target controller. The target controller communicates with a host data processing system. The target controller, for example, may send the event data collected by the universal monitor circuits to the host data processing system. The target controller further may receive instructions from the host data processing system. The instructions, for example, may control operation of the universal monitor system. Further, the instructions may specify and/or define the particular events that are to be detected by each of the respective trigger circuits.

One or more aspects of the inventive arrangements disclosed herein may be implemented as a system that includes a data processing system, e.g., a computer, in communication with a programmable IC. One or more aspects of the inventive arrangements described within this disclosure also may be implemented as a method or process performed by a universal monitor system within an IC. Further aspects may be implemented as a computer readable storage medium storing program code that, when executed by a processor, causes the processor to perform a method or process.

For purposes of simplicity and clarity of illustration, elements shown in the figures have not necessarily been drawn to scale. For example, the dimensions of some of the elements may be exaggerated relative to other elements for clarity. Where considered appropriate, reference numbers are repeated among the figures to indicate corresponding, analogous, or like features.

Several definitions that apply throughout this disclosure are presented below. As defined herein, the term "automatically" means without user intervention. As defined herein, the term "user" means a human being. As defined herein, the term "runtime" means at a time where a circuit design including a universal monitor system is loaded, implemented, and operating within an IC.

FIG. 1 is a block diagram illustrating an exemplary circuit design and test environment (environment) 100. As pictured, environment 100 includes a host data processing system (host) 105 having a display device 110. Host 105, for example, may be implemented as a computer system or the like. Host 105 is coupled to a target platform 115 through a communication link 125.

Target platform 115 may be implemented as a circuit board such as a printed circuit board having circuitry implemented thereon. Target platform 115 may include a connector that couples to communication link 125. The connector may be coupled, using circuitry of target platform 115, to an IC 120. IC 120 is coupled to target platform 115 using a socket, a receptacle, another mounting technique such as soldering IC 120 directly to target platform 115, or the like. In any case, IC 120 couples to communication link 125 through target platform 115. In one aspect, IC 120 is a programmable IC. In another aspect, IC 120 is a system-on-chip (SOC). IC 120 implements user circuit designs that have incorporated therein, a universal monitor system that operates in cooperation with host 105.

As noted, host 105 is coupled to target platform 115 through communication link 125. Communication link 125 may be implemented as any of a variety of different wired and/or wireless connections. Exemplary wired implementations of communication link 125 include, but are not limited to, point-to-point Ethernet, Universal Serial Interconnect (USB), FireWire (IEEE 1394 interface), or the like. Exemplary wireless implementations of communication link 125 include, but are not limited to, Bluetooth®, Wi-Fi®, or the like. In the case of a wireless implementation of communication link 125, the connector of target platform 115 may be implemented as a wireless transceiver. The exemplary communication links noted within this disclosure are provided for purposes of illustration only and not intended as limitations.

In operation, a user works through host 105 and selects one or more interconnects of a circuit design to be implemented within IC 120. For each interconnect, the user may specify the events that are to be monitored. Each event to be monitored may be specified by a user as the particular signals of the interconnect that are to be monitored and the particular state that each such signal is to have for the event. The user may select the interconnects as described as part of a circuit design implementation flow where the universal monitor system is automatically incorporated into the circuit design. In another aspect, the user may specify that a higher level of programmability is desired for the universal monitor system. In that case, the universal monitor system is implemented within the circuit design in a manner that allows the user to define, at runtime, the various events that are to be detected on the monitored interconnects. Configurability at runtime typically requires a larger amount of circuit resources and size compared to other implementations with less configurability at runtime.

Figure 2:
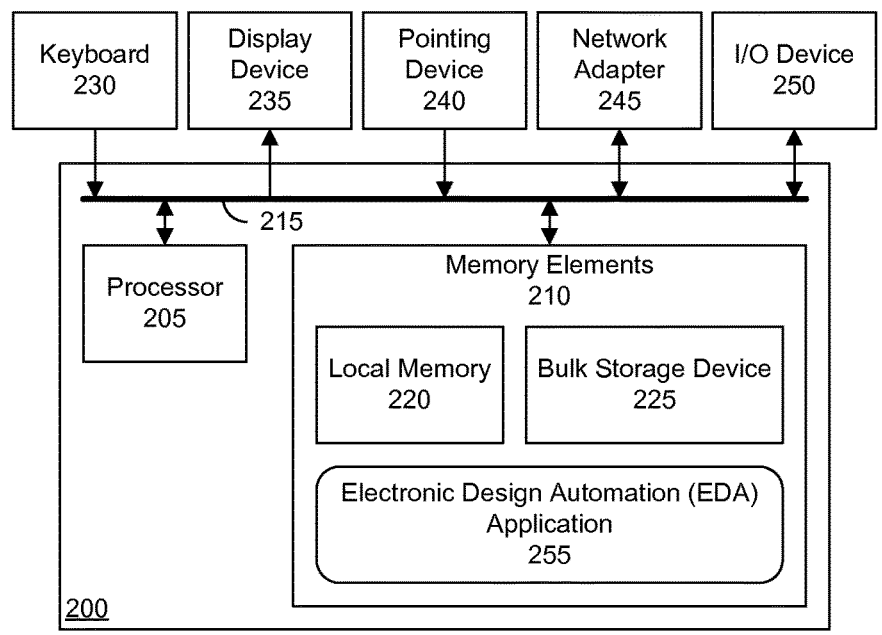
FIG. 2 is a block diagram illustrating an exemplary architecture for the host data processing system of FIG. 1.

FIG. 2 is a block diagram illustrating an exemplary architecture 200 for host 105 of FIG. 1. Architecture 200 includes at least one processor 205, e.g., a central processing unit (CPU), coupled to memory elements 210 through a system bus 215 or other suitable circuitry. Architecture 200 stores program code within memory elements 210. Processor 205 executes the program code accessed from memory elements 210 via system bus 215. In one aspect, architecture 200 may be used to implement a computer or other data processing system that is suitable for storing and/or executing program code. It should be appreciated, however, that architecture 200 may be used to implement any system including a processor and memory that is capable of performing the functions described within this disclosure.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally can be coupled to architecture 200. The I/O devices can be coupled to architecture 200 either directly or through intervening I/O controllers. A network adapter 245 also can be coupled to architecture 200 to enable a system implemented using architecture 200 to become coupled to other systems, computer systems, remote printers, remote storage devices, and/or target platform 115 of FIG. 1 through intervening private or public networks. Modems, cable modems, Ethernet cards, and wireless transceivers are examples of different types of network adapter 245 that can be used with architecture 200. An input/output (I/O) device 250 such as a USB port, a FireWire port, or the like also may be coupled to architecture 200 to allow a system implemented using architecture 200 to become coupled to another system such as any of the aforementioned systems including target platform 115 of FIG. 1.

Memory elements 210 store an electronic design automation (EDA) application 255. In one aspect, EDA application 255 may include one or more different components or modules (not shown). EDA application 255, being implemented in the form of executable program code, is executed by architecture 200. As such, EDA application 255 is considered part of a system implemented using architecture 200. Architecture 200, while executing EDA application 255, communicates with target platform 115 of FIG. 1. EDA application 255 and any data items used, generated, and/or operated upon by architecture 200 while executing EDA application 255 are functional data structures that impart functionality when employed as part of architecture 200.

Figure 3:
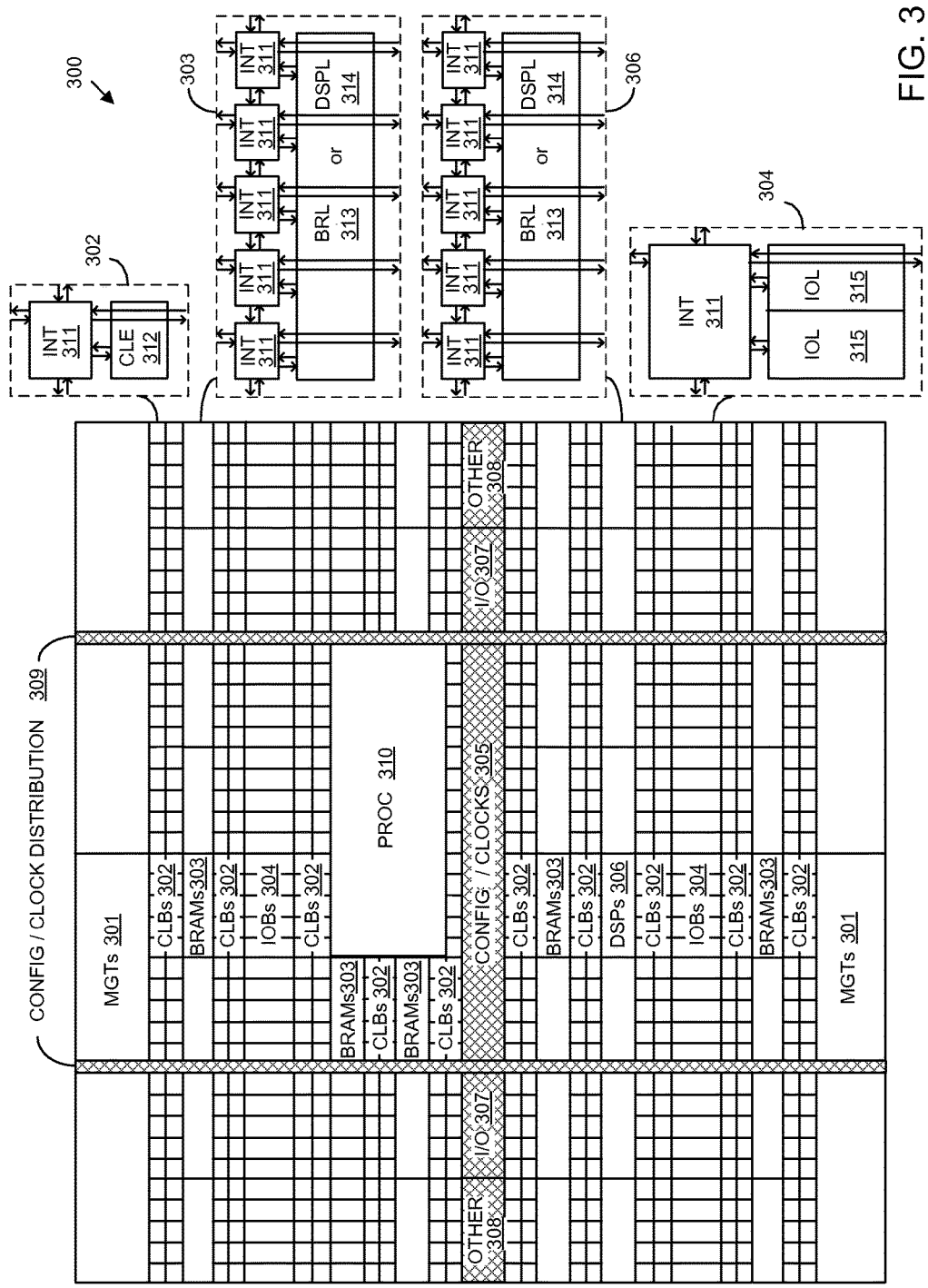
FIG. 3 is a block diagram illustrating an exemplary architecture for an integrated circuit (IC).

FIG. 3 is a block diagram illustrating an exemplary architecture 300 for an IC. For example, architecture 300 may be used to implement IC 120 of FIG. 1. In one aspect, architecture 300 is implemented within a field programmable gate array (FPGA) type of IC. Architecture 300 is also representative of an SOC type of IC. An SOC is an IC that includes a processor that executes program code and one or more other circuits and/or circuit systems. The circuits and/or circuit systems may operate cooperatively with one another and with the processor.

As shown, architecture 300 includes several different types of programmable circuit, e.g., logic, blocks. For example, architecture 300 can include a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 can include a configurable logic element (CLE) 312 that can be programmed to implement user logic plus a single INT 311. A BRAM 303 can include a BRAM logic element (BRL) 313 in addition to one or more INTs 311. Typically, the number of INTs 311 included in a tile depends on the height of the tile. As pictured, a BRAM tile has the same height as five CLBs, but other numbers (e.g., four) also can be used. A DSP tile 306 can include a DSP logic element (DSPL) 314 in addition to an appropriate number of INTs 311. An IOB 304 can include, for example, two instances of an I/O logic element (IOL) 315 in addition to one instance of an INT 311. As will be clear to those of skill in the art, the actual I/O pads connected, for example, to IOL 315 typically are not confined to the area of IOL 315.

In the example pictured in FIG. 3, a columnar area near the center of the die, e.g., formed of regions 305, 307, and 308, can be used for configuration, clock, and other control logic. Horizontal areas 309 extending from this column are used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks can be programmable blocks and/or dedicated circuitry. For example, a processor block depicted as PROC 310 spans several columns of CLBs and BRAMs.

In one aspect, PROC 310 is implemented as a dedicated circuitry, e.g., as a hard-wired processor, that is fabricated as part of the die that implements the programmable circuitry of the IC. PROC 310 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 310 is omitted from architecture 300 and replaced with one or more of the other varieties of the programmable blocks described. Further, such blocks can be utilized to form a "soft processor" in that the various blocks of programmable circuitry can be used to form a processor that can execute program code as is the case with PROC 310.

The phrase "programmable circuitry" means programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 3 that are external to PROC 310 such as CLBs 302 and BRAMs 303 are considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks that is otherwise non-existent.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry has dedicated circuit blocks and interconnects, for example, that are functional without first loading a configuration bitstream into the IC. An example of hardwired circuitry is PROC 310.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 3 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 3 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 310 within the IC are for purposes of illustration only and are not intended as a limitation.

Figure 4:
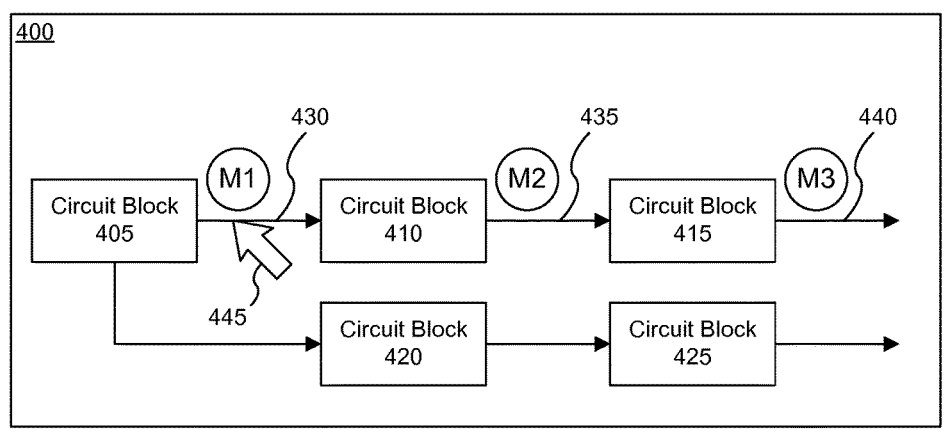
FIG. 4 is a block diagram illustrating an exemplary window of a graphical user interface (GUI) displayed by the host of FIG. 1.

FIG. 4 is a block diagram illustrating an exemplary window 400 of a graphical user interface (GUI) displayed by the host of FIG. 1. Window 400, for example, may be generated by EDA application 255 and is presented on display device 235. Window 400 shows a visualization of a circuit design including a plurality of circuit blocks. A user may interact with window 400 to select one or more interconnects that are to be monitored.

As pictured, the circuit design includes circuit blocks 405, 410, 415, 420, and 425. Circuit block 405 is coupled to circuit block 410 by interconnect 430. Circuit block 410 is coupled to circuit block 415 by interconnect 435. Circuit block 415 outputs data on an interconnect 440. Interconnect 440 may couple to another circuit block of the circuit design not pictured in FIG. 4. Circuit block 405 is coupled to circuit block 420 using an interconnect. Further, circuit block 420 is coupled to circuit block 425 using an interconnect.

A user may use pointer 445 to select each interconnect of the circuit design that is to be monitored. For example, the user may select the interconnect to be monitored using pointer 445, keyboard commands, or other forms of user input. Having selected an interconnect, the user may invoke one or more commands through host 105 using pointer 445, keyboard commands, or the like to indicate that monitoring of the interconnect is desired.

In the example shown, the user has selected interconnect 440, interconnect 435, and interconnect 430 and indicated that monitoring is desired. Responsive to a user input indicating that monitoring of an interconnect is desired, the host displays an indicator such as "M1," "M2," and "M3" next to each interconnect selected for monitoring. Each indicator means that a universal monitor circuit is to be inserted on the selected interconnect. It should be appreciated that host 105 may utilize any of a variety of different visualization techniques, e.g., highlighting, color coding, patterns, etc., to visually distinguish an interconnect that is monitored, or selected for monitoring, from an interconnect that is not monitored or selected for monitoring. As such, the inventive arrangements are not intended to be limited by the particular visualization technique that is used.

In one aspect, since each of interconnects 430, 435, and 440 is specified within the circuit design, the type of each interconnect may be determined by host 105. As such, the wires, or signals, forming each interconnect are known. In a further aspect, host 105 may present a configuration window wherein the user may define the particular events that are to be detected by each universal monitor circuit. In defining each event, the user may specify, on a per-event basis, which signals are to be monitored and the state of each monitored signal of the monitored interconnect. In this regard, the events to be monitored may differ from one interconnect to another interconnect. In one aspect, each interconnect selected for monitoring may be of a same type. In another aspect, however, one or more or all of the interconnects selected for monitoring may be different types.

Figure 5:
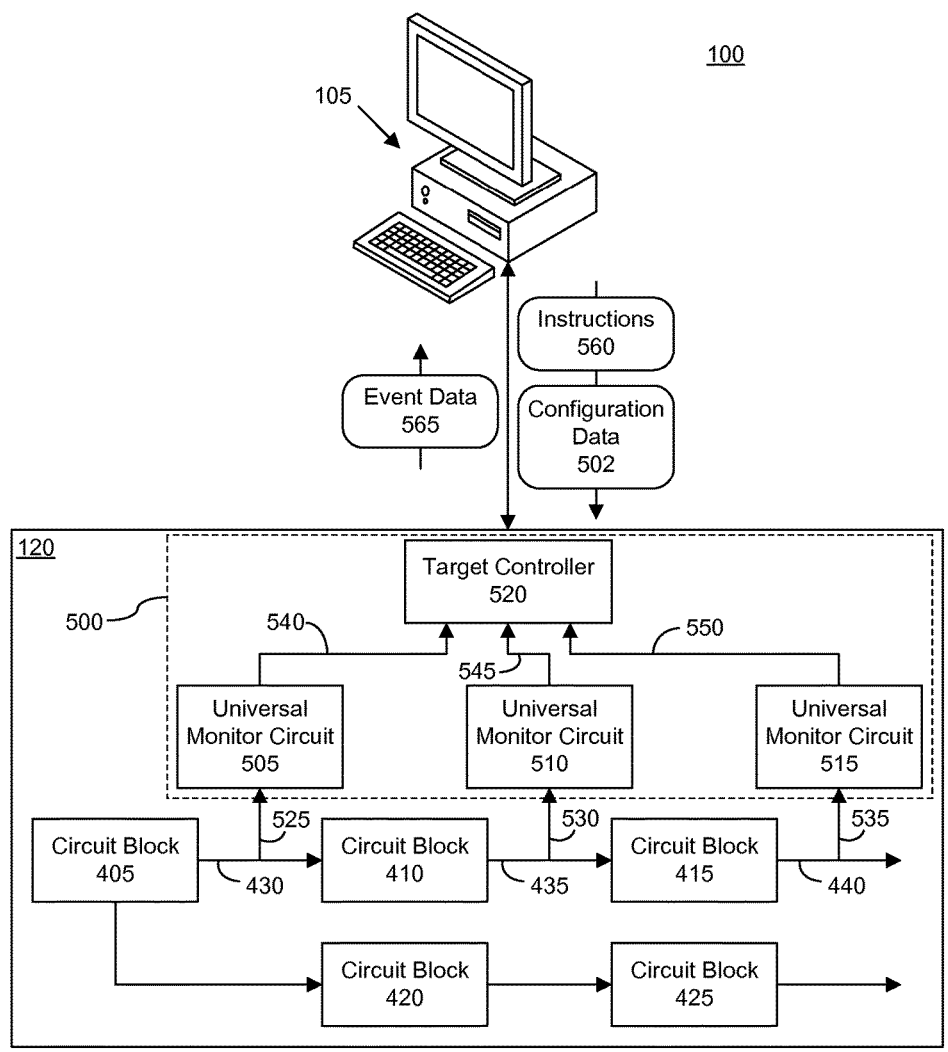
FIG. 5 is a block diagram illustrating the environment of FIG. 1 including a universal monitor system implemented within the IC.

FIG. 5 is a block diagram illustrating environment 100 with universal monitor system 500 implemented within the IC. For ease of illustration, target platform 115 is not shown. In the example of FIG. 5, host 105 has automatically inserted universal monitor system 500 within the circuit design and performed an implementation flow upon the circuit design. Host 105 generates configuration data 502, e.g., a configuration bitstream, and provides configuration data 502 to IC 120 over communication link 125.

Responsive to receiving configuration data 502, the circuit design, including inserted universal monitor system 500, is implemented within IC 120. One or more of circuit blocks 405, 410, 415, 420, 425, and universal monitor system 500 may be implemented using the programmable circuitry of IC 120. It should be appreciated that while reference numbers 405, 410, 415, 420, 425, 430, 435, and 440 are used in FIG. 4 to represent visualizations of circuit structures, the same reference numbers are used in FIG. 5 to represent actual physical implementations of the circuit structures in IC 120.

While not shown, one skilled in the art will appreciate that configuration data 502 is received within IC 120 by a configuration controller. The configuration controller stores configuration data 502 into appropriate configuration memory cells of IC 120. The configuration controller is distinct from the processor, e.g., PROC 310, previously described with reference to architecture 300. The configuration controller does not execute user program code, but rather is reserved exclusively for processing configuration data to implement circuit designs within IC 120.

For each of interconnects 430, 435, and 440 selected for monitoring, universal monitor system 500 includes a universal monitor circuit. As shown, universal monitor circuit 505 is coupled to interconnect 430 using signals 525. Universal monitor circuit 510 is coupled to interconnect 435 using signals 530. Universal monitor circuit 515 is coupled to interconnect 440 using signals 535. For example, signals 525, 530, and 535 may be those signals of interconnects 430, 435, and 440, respectively, specified by the user to be monitored for the particular events to be detected by each respective universal monitor circuit 505, 510, and 515. Signals 525, 530, and 535 are automatically inserted into, or created within, the circuit design with universal monitor system 500.

In one aspect, the particular events that each of universal monitor circuits 505, 510, and 515 is to detect may be initially specified by configuration data 502. As such, upon loading configuration data 502, each of universal monitor circuits 505, 510, and 515 may be configured upon implementation to detect particular events on interconnects 430, 435, and 440, respectively.

Universal monitor system 500 further includes a target controller 520. Universal monitor circuit 505 is coupled to target controller 520 using signals 540. Universal monitor circuit 510 is coupled to target controller 520 using signals 545. Universal monitor circuit 515 is coupled to target controller 520 using signals 550. In general, target controller 520 receives and implements instructions 560 from host 105. Further, target controller 520 receives event data 565 from universal monitor circuits 505, 510, and 515, processes event data 565, and provides event data 565 to host 105 for analysis and/or display or other presentation to a user.

In one aspect, instructions 560 may specify testing commands such as start monitoring, stop monitoring, requests for event data, or the like. In another aspect, however, instructions 560 may be used to define, or redefine, the event(s) that each of universal monitor circuits 505, 510, and 515 are to detect on interconnects 430, 435, and 440, respectively. In that case, instructions 560 allow a user to reprogram, or reconfigure, the universal monitor circuits during runtime to detect different events than originally specified. As noted, in defining an event, the instructions specify which signal or signals of the interconnect are to be monitored and, as such, provided to the universal monitor circuit. The instructions, in defining the event, further indicate the state of each monitored signal. Target controller 520, in receiving instructions 560, programs the particular universal monitor circuits to which each instruction is intended. For example, each instruction or group of instructions, when defining an event, may specify the particular universal monitor circuit that the instruction is intended to reconfigure. Target controller 520 reconfigures universal monitor circuits 505, 510, and/or 515 in accordance with received instructions 560. It should be appreciated that each of universal monitor circuits 505, 510, and 515 may be dynamically configured during runtime to detect different events without having to change the design or re-program IC 120.

Figure 6:
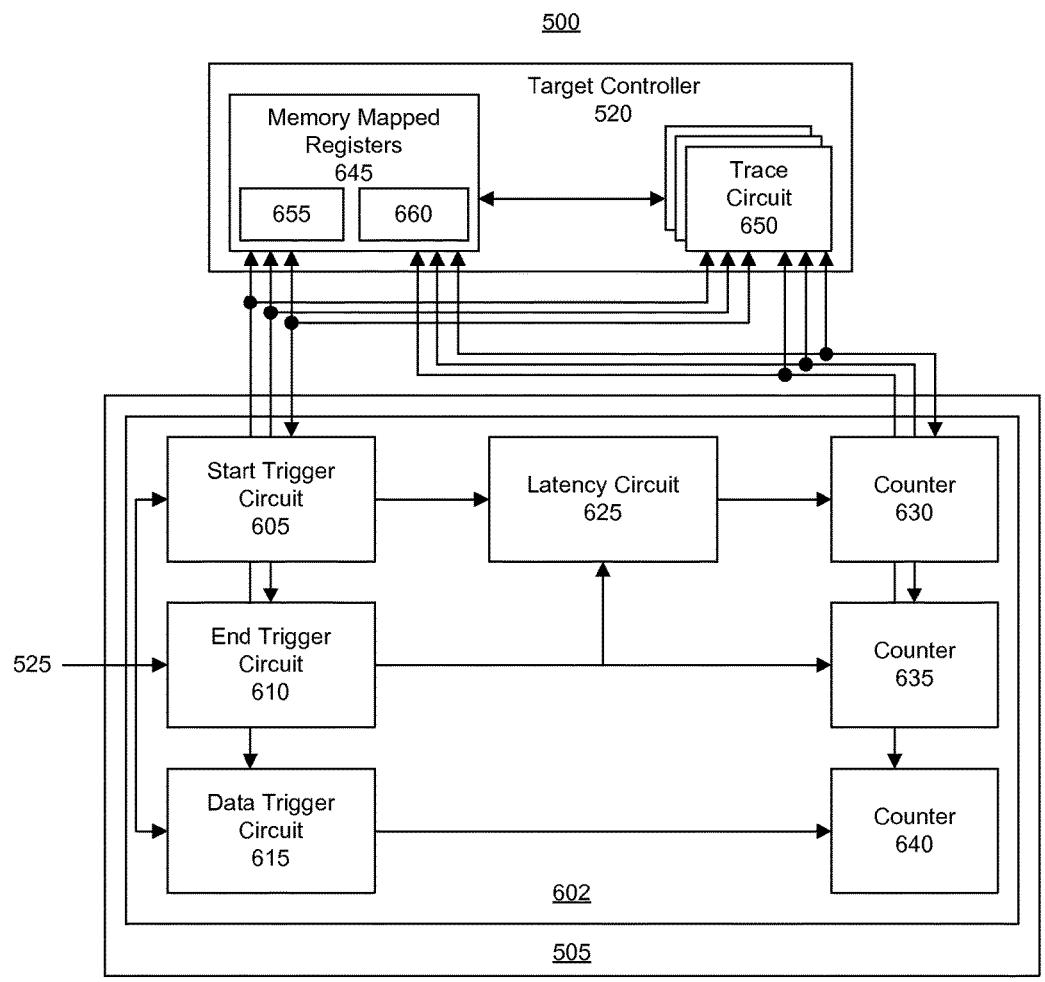
FIG. 6 is a block diagram illustrating an exemplary implementation of the universal monitor system of FIG. 5.

FIG. 6 is a block diagram illustrating an exemplary implementation of universal monitor system 500. For purposes of illustration, only universal monitor circuit 505 is shown. Universal monitor circuit 505 includes a detector circuit 602. Detector circuit 602 includes a plurality of circuit blocks such as a start trigger circuit 605, an end trigger circuit 610, and a data trigger circuit 615. Detector circuit 602 also includes latency circuit 625 having a first port coupled to an output of start trigger circuit 605 and a second port coupled to an output of end trigger circuit 610.

Detector circuit 602 further includes a plurality of counters 630, 635, and 640. Each of counters 630, 635, and 640 is implemented as a circuit. Counter 630 has an input coupled to an output of latency circuit 625. Counter 635 has an input coupled to an output of end trigger circuit 610. Counter 640 has an input coupled to an output of data trigger circuit 615.

Target controller 520 includes a plurality of memory mapped registers 645 and optionally one or more trace circuits 650. In one aspect, when target controller 520 utilizes trace circuits 650, target controller 520 includes one trace circuit 650 for each universal monitor circuit included within the circuit design. Referring to FIG. 5, for example, target controller 520 includes three (3) trace circuits 650. A one-to-one correspondence between trace circuits 650 and universal monitor circuits 505, 510, and 515 is maintained.

Memory mapped registers 645 serve as input/output circuitry for universal monitor system 500. Each of counters 630, 635, and 640 is coupled to a register of memory mapped registers 645. Each of counters 630, 635, and 640 outputs the counter value stored therein from time-to-time or periodically, to a particular one of memory mapped registers 645. As such, the host may read one or more of memory mapped registers 645 from time-to-time, responsive to user requests, or periodically, e.g., every 10 milliseconds or the like. Since each universal monitor circuit is coupled to memory mapped registers 645, the data processing system is able to read the counter values of one or more or all of the counters for any given universal monitor circuit, combination of universal monitor circuits, or all universal monitor circuits as desired.

In one aspect, memory mapped registers 645 include a first subset 655 of memory mapped registers 645 and a second subset 660 of memory mapped registers 645. Subset 655 stores instructions received from the host. The instructions, at least in part, define the particular events that each of the trigger circuits, e.g., 605, 610, and 615, are to detect. Subset 655 may store instructions received for each detection circuit implemented within IC 120. Further, subset 655 may store instructions that start and stop operation of universal monitor circuit 505. As shown, start trigger circuit 605, end trigger circuit 610, and data trigger circuit 615 each is coupled to memory mapped registers 645 to receive instructions defining events to be detected and other instructions such as start and stop.

Subset 660 stores counter values received from each of the counters of the universal monitor circuits implemented within IC 120. As pictured, each of counters 630, 635, and 640 is coupled to memory mapped registers 645 so that the counter value of each respective counter may be stored in a corresponding register of subset 660. As discussed, memory mapped registers 645, e.g., subset 660, may be read by the host to retrieve counter values as event data 565.

Trace circuits 650 optionally may be implemented as buffer memories that store time stamped events and/or counter data. While memory mapped registers 645 store counter values as event data, trace circuits 650 may store raw event data such as the time stamped events detected by each of trigger circuits 605, 610, and 615. Trace circuits 650 may or may not store the counter values in addition to the raw data described. For example, each trace circuit 650 may store time stamped counter events such as start events for a transaction, end events for a transaction, and beat transfers as detected by the various trigger circuits of the particular universal monitor circuit to which trace circuit 650 is coupled.

Start trigger circuit 605 receives one or more signals from interconnect 430 and detects a start event for a particular transaction type from the signals. In one aspect, the transaction type is a read transaction. In another aspect, the transaction type is a write transaction. The particular signals that are to be monitored for start events and the state of the signals that defines a start event are determined by the configuration data initially loaded into IC 120 and/or instructions received by start trigger circuit 605 from target controller 520.

End trigger circuit 610 receives one or more signals from interconnect 430 and detects an end event for a particular transaction type from the signals. Exemplary transaction types include, but are not limited to, read transactions and write transactions. The particular signals that are to be monitored for end events and the state of the signals that defines an end event are determined by the configuration data initially loaded into IC 120 and/or instructions received by end trigger circuit 610 from target controller 520.

Data trigger circuit 615 receives one or more signals from interconnect 430 and detects the transfer of segments of data for a particular transaction type from the signals. The term "segment" is used to refer to an amount of transferred data detected by data trigger circuit 615. A segment may be specified as a beat of data, a particular number of bytes of data, or other measure specified as a value within a header of packetized data. As noted, exemplary transaction types include read transactions and write transactions. The particular signals that are to be monitored for data transfers and the state of the signals that defines a data transfer event are determined by the configuration data loaded into IC 120 and/or instructions received by data trigger circuit 615 from target controller 520.

Thus, in one aspect, data trigger circuit 615 detects beats of transferred data. As defined herein, a "beat" of data means each data item transferred as part of a burst of data. In illustration, consider a 32-bit interconnect. One beat of data is transferred each time a 32-bit word is transferred on the interconnect. The amount of data for a beat depends upon the width of the interconnect over which data is provided.

In another aspect, data trigger circuit 615 is configured to detect a value within packetized data. In that case, the value may indicate the amount of data that is being transferred as opposed to detecting a transferred beat of data. The particular event detected depends upon the communication protocol in effect upon the monitored interconnect.

Detection circuit 602 is dedicated to detecting event types of a particular transaction type. For example, if the selected transaction type is "read," then start trigger circuit 605 detects start event for reads. Similarly, end trigger circuit 610 detects end events for reads. Data trigger circuit 615 detects transferred segments of read data. In another example, when the selected transaction type is "write," start trigger circuit 605 detects start events for write transactions. End trigger circuit 610 detects end events for write transactions. Data trigger circuit 615 detects transferred segments of data for write transactions. In this regard, universal monitor circuit 505 may include one or more additional detector circuits 602, where each different detector circuit is dedicated to detecting events for different transactions types on a same interconnect.

Start trigger circuit 605 detects start events from selected signals of interconnect 430. In one aspect, start trigger circuit 605 outputs a time stamp of each detected start event and provides the time stamp to latency circuit 625. In another aspect, start trigger circuit 605 outputs a trigger event signal indicating a detected start event. The trigger event signal is provided to latency circuit 625.

End trigger circuit 610 detects end events from selected signals of interconnect 430. In one aspect, end trigger circuit 610 outputs a time stamp of each detected end event and provides the time stamp to latency circuit 625. In another aspect, end trigger circuit 610 outputs a trigger event signal indicating a detected end event. The trigger event signal is provided to latency circuit 625.

Responsive to receiving a time stamp of an end event, latency circuit 625 matches the received end event with a corresponding start event for the same transaction. Latency circuit 625 subtracts the time stamp of the start event from the time stamp of the end event to determine a difference representing latency for the transaction. Latency circuit 625 outputs the calculated latency and provides the latency to counter 630. Counter 630, responsive to receiving the latency from latency circuit 625, increments by the latency amount. For example, if the latency is calculated as 16, counter 630 is incremented by 16. As such, counter 630 maintains a counter value representing a total latency of transactions of the selected type occurring on interconnect 430.

In another aspect, latency circuit 625 receives indications of start and end events. Latency circuit 625 maintains a count of outstanding, or unfinished, transactions. The count is provided to counter 630 each clock cycle and increments the count of counter 630 by the number of outstanding transactions in the current clock cycle. As such, counter 630 maintains a total latency.

End trigger circuit 610 outputs a time stamp or other indicator signal to counter 635 each time an end event is detected on interconnect 430. As such, counter 635 maintains a count of the total number of end events detected on interconnect 430. In one aspect, the total number of end events may represent the total number of transactions since each transaction is presumed to have a start event and an end event. In another aspect, start trigger circuit 605 may be coupled to counter 635 in lieu of end trigger circuit 610. In that case, start trigger circuit 605 outputs a time stamp or other indicator signal to counter 635 each time a start event is detected. Counter 635, when coupled to start trigger circuit 605, maintains a count of the total number of start events detected on interconnect 430. The total number of start events may represent the total number of transactions.

Data trigger circuit 615 outputs a time stamp or other indicator for each transferred segment of data to counter 640. Counter 640 may be configured to count a total amount of data transferred. The total amount of data may be calculated using any of a variety of different measurement units. In one example, counter 640 may be a byte counter. In that case, recalling the prior example of a 32-bit interconnect, counter 640 increments the counter value stored therein by four (4) each time data trigger circuit 615 indicates that one beat of data has been transferred for the selected transaction type. In another aspect, counter 640 may increment, or be incremented by data trigger circuit 615, by the value determined from packetized data indicating the amount of data transferred or the length of the packet.

The counter values that are calculated allow various performance metrics to be calculated. For example, average latency may be calculated as (total latency)/(number of transactions), i.e., the counter value of counter 630 divided by the counter value of counter 635. In one aspect, each universal monitor circuit may include an additional circuit block (not shown) that performs the average latency calculation and stores the result in one or more of memory mapped registers 645. In another aspect, host 105 may be configured to calculate individual latencies for transactions using time stamped event data obtained from trace circuit(s) 650. Average throughput may be calculated as (total bytes)/(sample period), i.e., counter value 640 divided by the counter value of counter 630. For example, an additional circuit block may be included in each universal monitor circuit that is configured to calculate the average throughput and store the result in one or more of memory mapped register 645.

Figure 7:
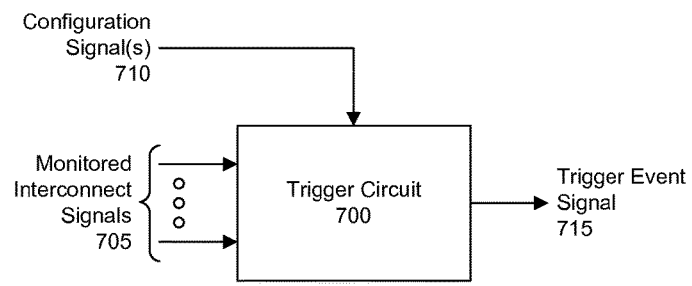
FIG. 7 is a block diagram illustrating an exemplary implementation of a trigger circuit.

FIG. 7 is a block diagram illustrating an exemplary implementation of a trigger circuit 700. Trigger circuit 700 may represent a start event trigger circuit, an end event trigger circuit, a data trigger circuit, and/or any of a variety of customizable trigger circuits that may be included within a universal monitor circuit in addition to those described in place of those described.

As shown, trigger circuit 700 receives selected ones of interconnect signals depicted as monitored interconnect signals 705. Further trigger circuit 700 is coupled to a configuration signal 710. In one aspect, configuration signal 710 may specify events to be detected by trigger circuit 700 dynamically at runtime without having to make any physical changes to trigger circuit 700 or otherwise re-program IC 120. Configuration 710, for example, may be a connection to the target controller through which instructions are received specifying the particular events that are to be detected.

Responsive to detecting a particular event, trigger circuit 700 outputs an indication on trigger event signal 715. In one aspect, the indicator may be simple indication such as a signal going low or high as the case may be. In another aspect, trigger event signal 715 may be a time stamp determined responsive to detection of the event.

Figure 8:
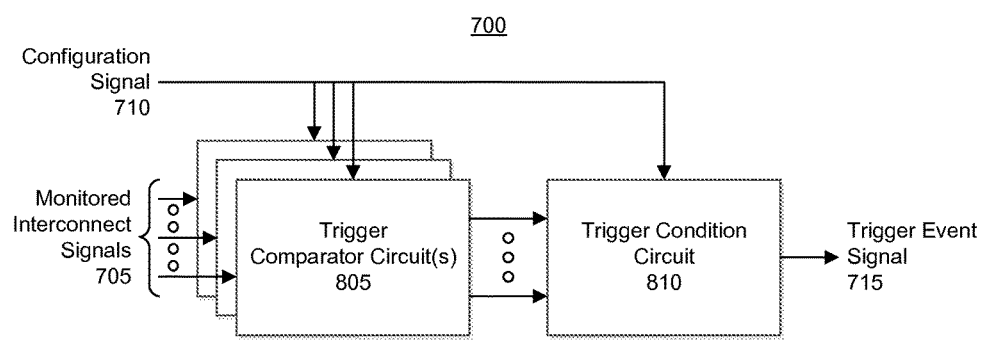
FIG. 8 is a block diagram illustrating a more detailed implementation of the trigger circuit of FIG. 7.

FIG. 8 is a block diagram illustrating a more detailed implementation of trigger circuit 700 of FIG. 7. As pictured, trigger circuit 700 includes a plurality of trigger comparator circuits 805. Each trigger comparator circuit 805 may monitor one or more signals to detect a particular state, e.g., high or low, upon such monitored signals. In some cases, signals received by one or more of trigger comparator circuits 805 may be passed through to trigger condition circuit 810. An example of a trigger comparator circuit that is runtime configurable is described in U.S. Pat. No. 6,384,627 assigned to Xilinx, Inc. of San Jose, Calif. U.S. Pat. No. 6,384,627 is fully incorporated herein by reference.

Each trigger comparator circuit 805 is coupled to trigger condition circuit 810. In one exemplary implementation, trigger condition circuit 810 may be implemented to perform one or more Boolean operations upon signals from trigger comparator circuits 805. In another exemplary implementation, trigger condition circuit 810 may implement a state machine that detects particular sequences of values on one or more of the signals received from trigger comparator circuits 805.

Figure 9:
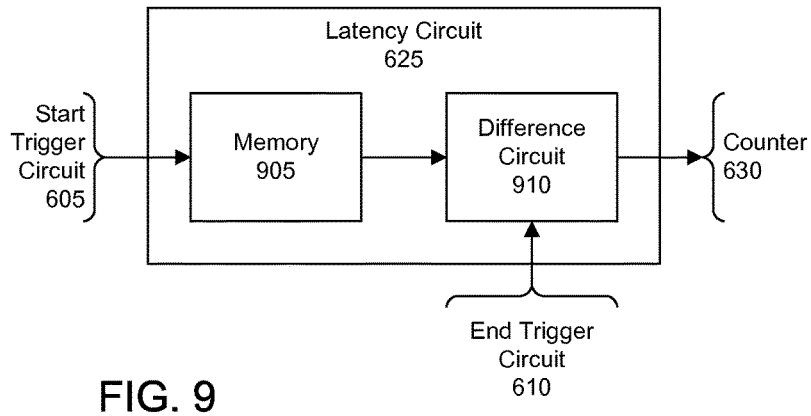
FIG. 9 is a block diagram illustrating an exemplary implementation of the latency circuit of FIG. 6.

FIG. 9 is a block diagram illustrating an exemplary implementation of latency circuit 625 of FIG. 6. As shown, latency circuit 625 includes a memory 905 and a counter circuit 910. Memory 905 includes a first port coupled to an output of start trigger circuit 605 and a second port coupled to a first input port of difference circuit 910. Difference circuit 910 includes a second input port that is coupled to an output of end trigger circuit 610. Difference circuit 910 outputs a result to counter 630.

In operation, start trigger circuit 605 detects start events from selected signals of interconnect 430. In one aspect, start trigger circuit 605 outputs a time stamp of each detected start event and stores the time stamp in memory 905. End trigger circuit 610 detects end events from selected signals of interconnect 430. In one aspect, end trigger circuit 610 outputs a time stamp of each detected end event to difference circuit 910.

Responsive to receiving a time stamp of an end event, difference circuit 910 reads the time stamp of the start event that corresponds to the received time stamp of the end event from end trigger circuit 610. Difference circuit 910 subtracts the time stamp of the start event from the time stamp of the end event for the same transaction to determine a difference representing latency for the transaction. Difference circuit 910 outputs the calculated latency and provides the latency to counter 630. Counter 630, responsive to receiving the latency from difference circuit 910, increments by the latency amount. For example, if the latency is calculated as 16, counter 630 is incremented by 16. As such, counter 630 maintains a counter value representing a total latency of transactions of the selected type occurring on interconnect 430.

In one aspect, difference circuit 910 assumes that there are no out of order transactions. In that case, memory 905 may be implemented as a first-in-first-out memory. Accordingly, responsive to receiving a time stamp of an end event from end trigger circuit 610, difference circuit 910 may pop a next time stamp of a start event from memory 905.

In another aspect, the transactions may be out of order. In that case, each time stamp of an end event must be matched to the time stamp of a corresponding start event. The time stamp of the corresponding start event is read from memory 905 once located and used in the difference calculation. Some communication protocols utilize a transaction identifier, or "transaction ID," to specify where a transaction came from or originated. In those cases, start trigger circuit 605 determines a transaction ID for the start event and stores the transaction ID in association with the time stamp of the start event in memory 905. End trigger circuit 610 determines a transaction ID for the end event. Accordingly, difference circuit 910 matches the transaction ID of the end event with the transaction ID of the start event when reading the time stamp of the start event from memory. The transaction ID of the start event and the transaction ID of the end event must be matched by difference circuit 910 to determine the correct time stamp of the start event. In cases as described, memory 905 may be a more complex memory structure such as a RAM, a Content Addressable Memory (CAM), or the like, to support searching by difference circuit 910 based upon transaction ID.

Figure 10:
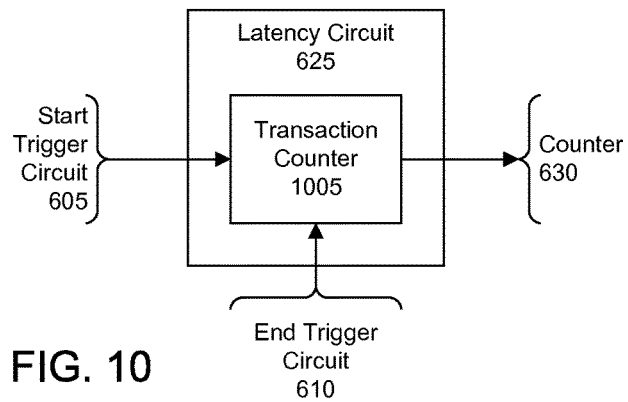
FIG. 10 is a block diagram illustrating another exemplary implementation of the latency circuit of FIG. 6.

FIG. 10 is a block diagram illustrating another exemplary implementation of latency circuit 625 of FIG. 6. As shown, latency circuit 625 includes a transaction counter 1005. Transaction counter 1005 has a first input port coupled to an output of start trigger circuit 605. Transaction counter 1005 has a second input port coupled to an output of end trigger circuit 610. Transaction counter 1005 has an output port that is coupled to counter 630.

In one aspect, transaction counter 1005 increments the count stored therein responsive to each start event detected by start trigger circuit 605. Transaction counter 1005 decrements the count stored therein responsive to each end event detected by end trigger circuit 610. In this manner, transaction counter 1005 maintains a count of all unfinished, or pending, transactions.

Figure 11:
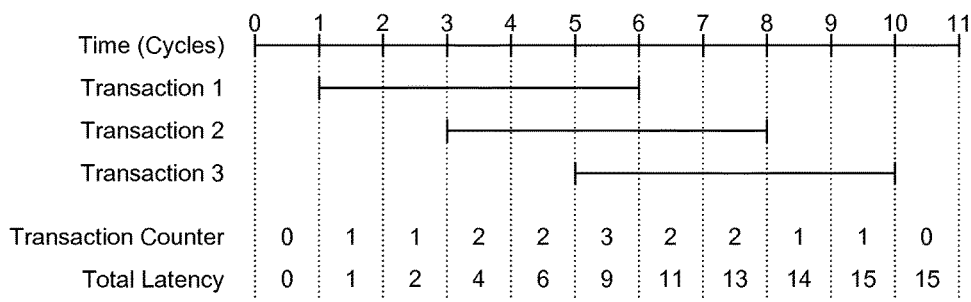
FIG. 11 is a timing diagram illustrating operation of the latency circuit as described with reference to FIG. 10.

FIG. 11 is a timing diagram illustrating operation of latency circuit 625 described with reference to FIG. 10. As shown, at cycle 0 no transactions have started. As such, the count, or value, stored in transaction counter 1005 is 0. Similarly, the total latency stored in counter 630 is 0.

At cycle 1, a start event of transaction 1 is detected. Accordingly, the value stored in transaction counter 1005 is incremented by 1. The latency counter outputs the stored counter value to counter 630 each clock cycle. As such, the value stored in counter 630 also is 1.

At cycle 2, transaction 1 is not complete. No other transactions have started. The value stored in transaction counter 1005 remains 1 since the value has not been incremented or decremented. Transaction counter 1005 again outputs the value stored therein to counter 630, which increments the value stored in counter 630 from 1 to 2.

At cycle 3, a start event for transaction 2 is detected. Accordingly, the value stored in transaction counter 1005 is incremented from 1 to 2. The value 2, as stored in transaction counter 1005, is output to counter 630, which increments the value stored in counter 630 from 2 to 4.

At cycle 4, neither transaction 1 nor transaction 2 is complete. No other transactions have started. The value stored in transaction counter 1005 remains 2. Transaction counter 1005 again outputs the value stored therein to counter 630, which increments the value stored in counter 630 from 4 to 6.

At cycle 5, a start event for a transaction 3 is detected. Accordingly, the value stored in transaction counter 1005 is incremented from 2 to 3. The value 3, as stored in transaction counter 1005, is output to counter 630, which increments the value stored in counter 630 from 6 to 9.

At cycle 6, an end event for transaction 1 is detected. Accordingly, the value stored in transaction counter 1005 is decremented from 3 to 2. The value 2, as stored in transaction counter 1005, is output to counter 630, which increments the value stored in counter 630 from 9 to 11.

The procedure continues as described and as illustrated in FIG. 11. The value stored in counter 630 represents a total latency that may be used to calculate an average latency for transactions being monitored.

Figure 12:
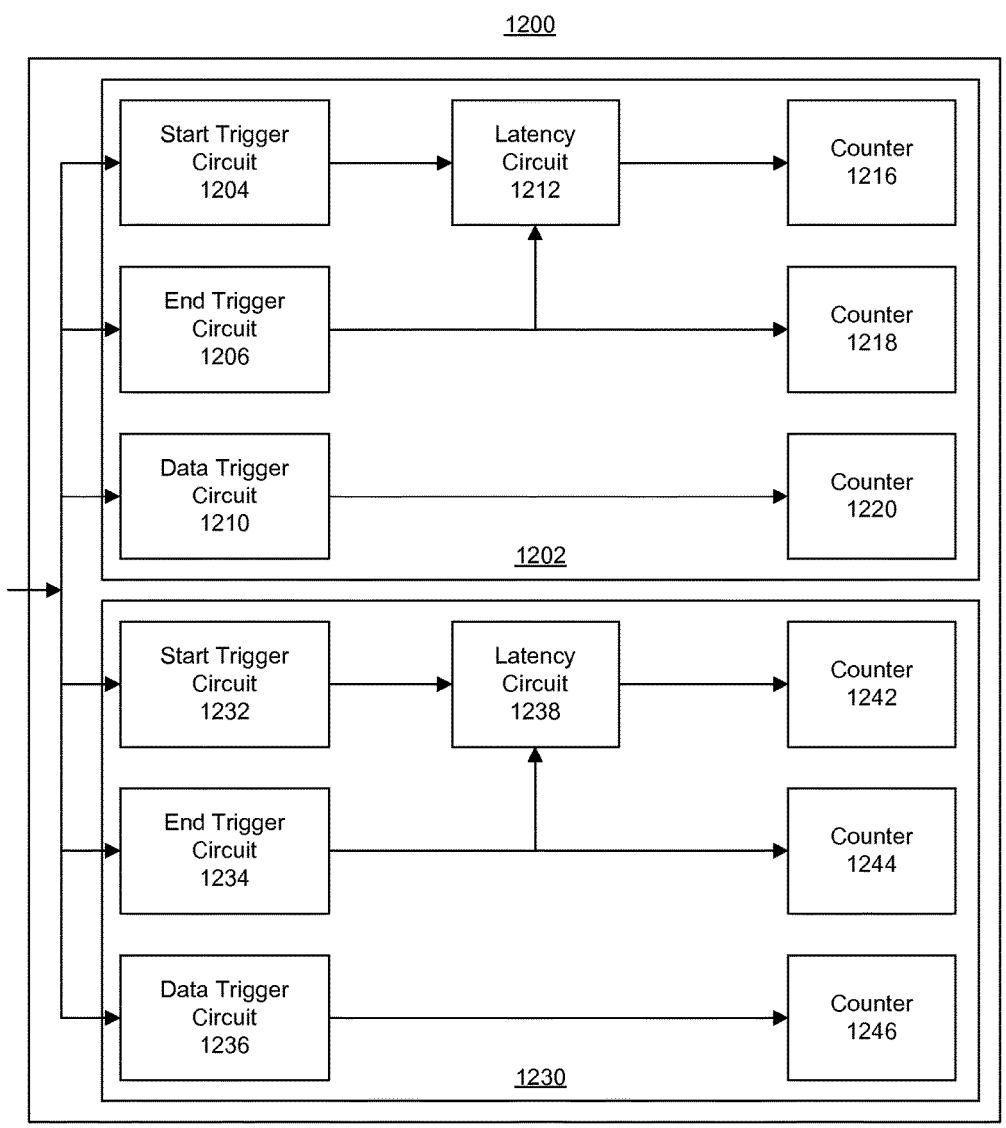
FIG. 12 is a block diagram illustrating an exemplary implementation of a universal monitor circuit.

FIG. 12 is a block diagram illustrating another exemplary implementation of a universal monitor circuit 1200. Universal monitor circuit 1200 includes a detector circuit 1202 and a detector circuit 1230. Detector circuit 1202 is dedicated for processing transactions of a first type on an interconnect. For example, detector circuit 1202 may be dedicated for processing read transactions. Detector circuit 1230 is dedicated for processing transactions of a second type on the same interconnect. For example, detector circuit 1202 may be dedicated for processing write transactions.

As pictured, detector circuit 1202 includes a start trigger circuit 1204, an end trigger circuit 1206, and a data trigger circuit 1208. Detector circuit 1202 also includes a memory 1212, a difference circuit 1214, and counters 1216, 1218, and 1220. Detector circuit 1230 includes a start trigger circuit 1232, an end trigger circuit 1234, and a data trigger circuit 1236. Detector circuit 1202 also includes a memory 1238, a difference circuit 1240, and counters 1242, 1244, and 1246.

Detector circuit 1202 and detector circuit 1230 each operates substantially as described with reference to FIG. 6. For example, counters 1216 and 1242 count total latency, but for different transaction types. Counters 1218 and 1244 count total start and/or end events, but for different transaction types. Counters 1220 and 1246 count total bytes transferred, but for different transaction types. Universal monitor circuit 1200, as described, may be coupled to memory mapped registers of the transaction controller and optionally a trace circuit.

The example of FIG. 12 is provided for purposes of illustration and, as such, is not intended to limit the inventive arrangements described within this disclosure. A universal monitor circuit may have a single detector circuit or two or more detector circuits in the case where transactions of two or more different types are to be monitored on a same interconnect.

Figure 13:
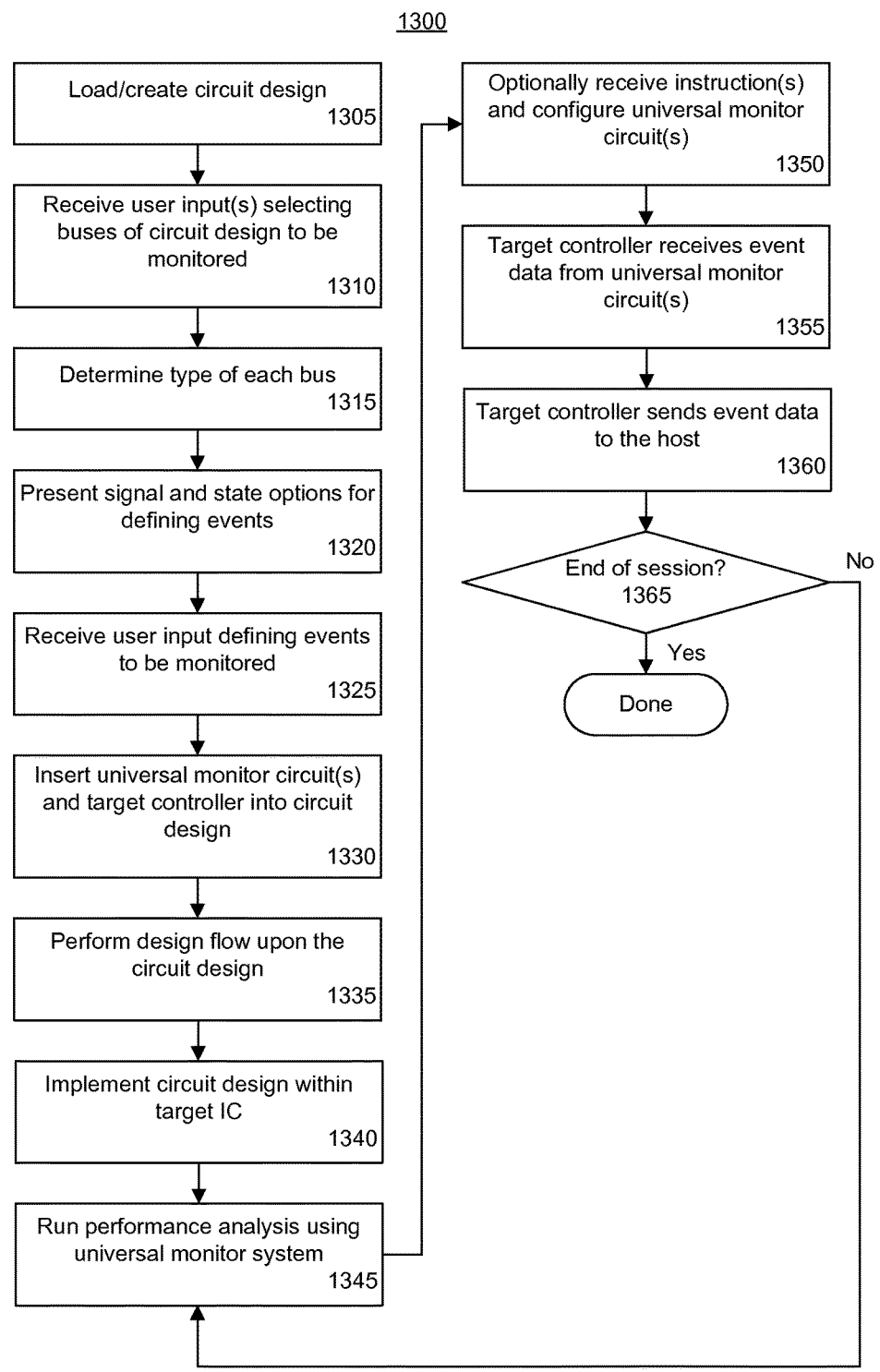
FIG. 13 is a flow chart illustrating an exemplary method of implementing and using a universal monitor system.

FIG. 13 is a flow chart illustrating an exemplary method 1300 of implementing and using a universal monitor system. Method 1300 begins in block 1305 where a circuit design is either created or loaded within the host. In block 1310, the host receives one or more user inputs that select particular interconnects of the circuit design to be monitored. The user further may specify the number of transaction types to be monitored for each interconnect, thereby specifying the number of detector circuits in each universal monitor circuit to be inserted into the circuit design.

In block 1315, the host determines the type of each interconnect that is to be monitored. For example, the host may include an intellectual property (IP) library. As such, each interconnect used in the circuit design is known and well defined. The host may determine the type of each interconnect, which means that for each interconnect, the host maintains a listing of the signals that form the interconnect.

In block 1320, the host may display signal and state options for defining events for each of the universal monitor circuits. In block 1325, the host receives one or more user inputs defining the events to be monitored. For example, using a GUI presented by the host, the user can select which signals are to be coupled to each of the trigger circuits included in the universal monitor circuits to be inserted into the circuit design. The user further may specify the state that each selected signal provided to a trigger circuit must have to define the event to be detected.

For purposes of illustration, consider the case where a selected interconnect is an Advanced eXtensible Interface (AXI) compliant interconnect. For example, the interconnect may be implemented in accordance with the ARM AMBA AXI Protocol v2.0 Specification available from ARM Limited. Responsive to determining that the selected interconnect is an AXI compliant interconnect, the host may present the user with a list of available signals for monitoring. For each trigger circuit of each detector circuit of the universal monitor circuit, the user may indicate which signals are to be routed to the trigger circuits and the state of the signals that constitutes the type of event to be detected. Signals and states may be specified on a per-trigger circuit basis.

In the case of AXI, for example, the user may specify that the address valid signal and the address ready signal are to be provided to the start trigger circuit. When both signals take on a state of 1 or high, a start event is detected by the start trigger circuit. The user further could select the data valid, the data ready, and the data last signals to be provided to the end trigger circuit. When each of the three signals takes on a state of 1 or high, an end event is detected for a transaction by the end trigger circuit. The aforementioned conditions may be used for both read and write transactions.

In block 1330, the host inserts, within the circuit design, a universal monitor circuit for each interconnect selected by the user for monitoring. As noted, each universal monitor circuit may include one or more detector circuits based upon user preference, the number of different transaction types that are to be monitored, and the like as determined from received user inputs. In block 1335, the host also inserts the target controller into the circuit design.

In block 1335, the host performs a design flow upon the circuit design. For example, the host may perform synthesis, mapping, placement, and routing to generate configuration data, e.g., a configuration bitstream. The resulting circuit design includes the universal monitor system with each component having the necessary signals and routing to operate within the circuit design. In block 1340, the circuit design is implemented within the target IC. For example, the host sends the configuration data to the target IC. The target IC loads the configuration data into configuration memory therein, thereby implementing the circuit design and universal monitor system.

In block 1345, the host runs performance analysis using the universal monitor system. In one aspect, performance analysis is performed with the settings defined within the configuration data. For example, the host may send start instructions to the IC thereby starting the various universal monitor circuits implemented within the IC and causing the target controller to begin to processing event data, send event data back to the host data processing system, and/or the like. The start trigger circuits begin detecting start events and determining a time stamp for each start event. The end trigger circuits begin detecting end events and determining a time stamp for each end event. The data trigger circuit begins detecting transferred segments of data and determining a time stamp for each transferred segment of data. The counters begin operating and counting events and/or values as described.

In block 1350, the IC optionally receives instructions from the host and configure the universal monitor circuits. For example, the target controller may monitor for instructions received from the host. The instructions may be for programming, or configuring, one or more of the universal monitor circuits implemented within the IC. More particularly, the instructions may be for configuring one or more of the trigger circuits. Responsive to receiving an instruction from the host, the target controller configures the particular trigger circuits to which the received instructions apply. As such, a user may configure a detector to detect a different event, e.g., a different start event, stop event, and or data segment detection during runtime. A "different event" means that a trigger circuit detects an event using either different signals than prior to being configured, at least one different signal state from prior to configuring, or both. It should be appreciated that in order to use a different signal, each signal that may be used as a consequence of configuring the trigger circuit must be provided to the trigger circuit as specified in the original configuration bitstream.

In block 1355, the target controller receives event data from the universal monitor circuits. In block 1360, the target controller provides the event data, or a portion thereof, to the host. In one aspect, the target controller may receive a request for event data from the host. The target controller may determine the particular register(s) of the memory mapped registers to be read in order to acquire the requested data. The target controller may read the values of the determined registers and send the values to the host.

In one aspect, the target controller may retrieve data from one or more trace units determined from a host request for event data. The target controller may reorder the data retrieved from two or more trace units so that the data is sent to the host in a particular order. The target controller may order data chronologically according to time stamp, according to transaction ID, etc. Further, the target controller, for example, may merge event data from two or more different universal monitors chronologically. For example, the target controller may chronologically order start events and stop events according to the time stamps for a plurality of different transactions occurring on a plurality of different interconnects and send the chronologically ordered start events and stop events to the host.

In another example, the target controller may send event data from one trace unit, then event data from another trace unit, etc., so that the event data is segregated according to trace unit and, as such, universal monitor circuit. It should be appreciated that sending data according to trace unit or universal monitor circuit results in sending start events and stop events for a plurality of different transactions occurring on a plurality of different interconnects to the host on a per-interconnect basis.

In block 1365, the target controller determines whether the current monitoring session is ended. If so, method 1300 may end. If not, method 1300 loops back to block 1345 to continue processing.

Figure 14:
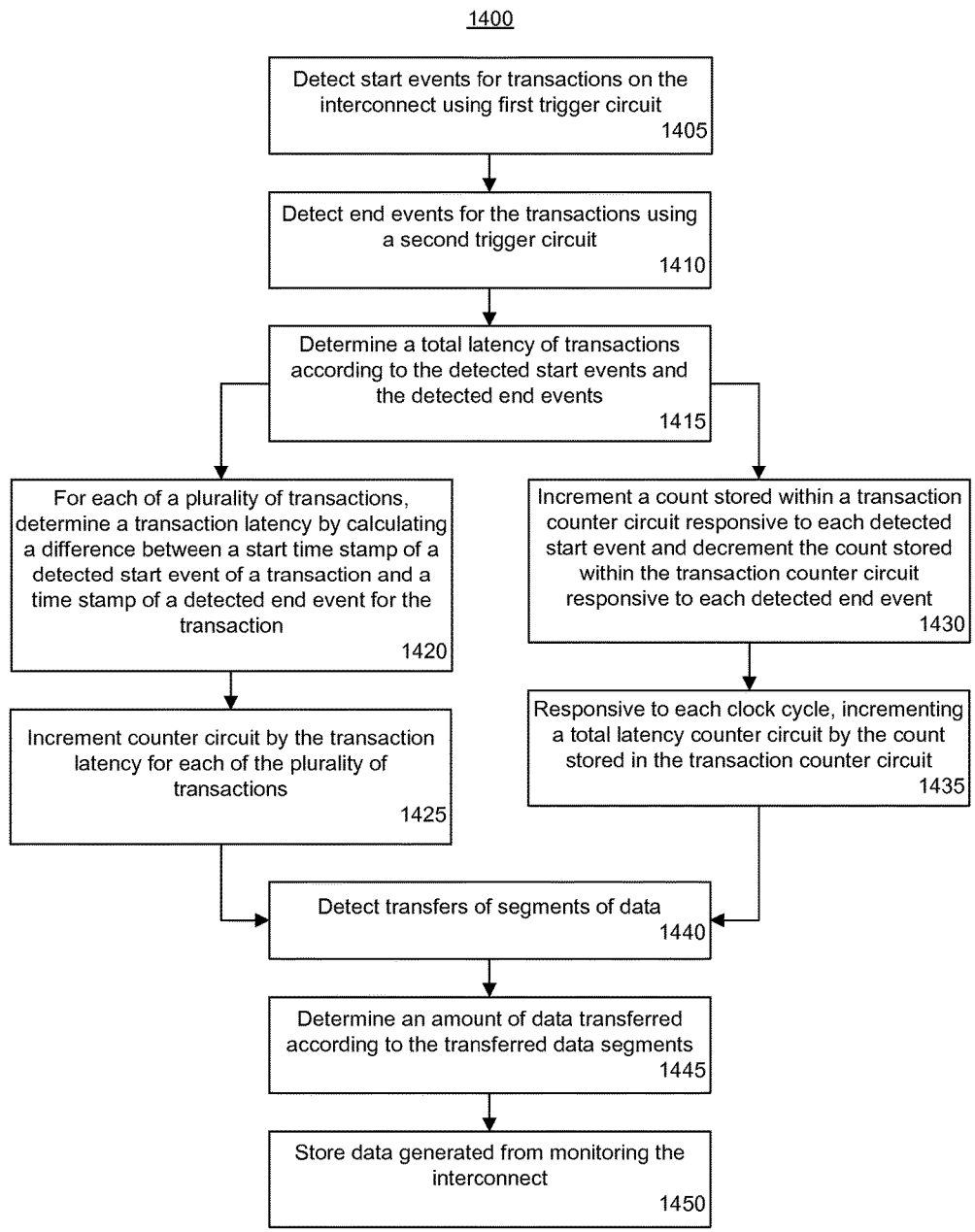
FIG. 14 is a flow chart illustrating an exemplary method of monitoring an interconnect within an IC.

FIG. 14 is a flow chart illustrating an exemplary method 1400 of monitoring an interconnect within an IC. Method 1400 may be performed by the universal monitor system described with reference to FIGS. 5, 6, and 12.

In block 1405, the universal monitor system detects start events for transactions on the interconnect using a first trigger circuit. In block 1410, the universal monitor system detects end events for the transactions using a second trigger circuit. In block 1415, the universal monitor system determines a total latency of transactions according to the detected start events and the detected end events.

For purposes of illustration, two different techniques for determining total latency are illustrated in FIG. 14. The first technique is illustrated by the path formed of blocks 1420 and 1425, which corresponds to the implementation of the latency circuit of FIG. 9. In block 1420, for each of a plurality of transactions, the latency circuit determines a transaction latency by calculating a difference between a start time stamp of a detected start event of a transaction and a time stamp of a detected end event for the transaction. In block 1425, the latency circuit increments a counter circuit that tracks total latency by the transaction latency determined for each of the plurality of transactions.

The second technique is illustrated by the path formed of blocks 1430 and 1435, which corresponds to the implementation of the latency circuit of FIG. 10. In block 1430, the latency circuit increments a count stored within a transaction counter circuit responsive to each detected start event and decrements the count stored within the transaction counter circuit responsive to each detected end event. The transaction counter circuit is implemented within the latency circuit. In block 1435, responsive to each clock cycle, the latency circuit increments a total latency counter circuit by the count stored in the first counter circuit.

It should be appreciated that the particular path taken depends upon the implementation of the latency circuit that is used. Further, different implementations of the latency circuit may be used within different universal monitor circuits and within different detector circuits within the universal monitor system if desired.

In block 1440, the universal monitor system detects transfers of data segments, e.g., using the data trigger circuit. In block 1445, the universal monitor system determines an amount of data transferred according to the transferred data segments. For example, a counter may be used to count transferred segments.

In block 1450, the universal monitor system stores data generated from monitoring the interconnect. Such data may be stored for each of a plurality of interconnects. As discussed, time stamps for start and/or stop events, any counts determined for start events, stop events, total latency, transferred data, or the like may be stored.

A universal monitor system is described within this disclosure that may be used to detect transaction events on a variety of different interconnect types. While event trigger circuits of the universal monitor system may be implemented to detect particular types of events, in another aspect, the event trigger circuits may be reprogrammed to detect different events during runtime.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a data storage medium which is a non-transitory computer-usable or computer-readable medium, storing program code that, when loaded and executed in a system including a processor, causes the system to initiate and/or perform at least a portion of the functions and/or operations described within this disclosure. Examples of data storage media can include, but are not limited to, optical media, magnetic media, magneto-optical media, computer memory such as random access memory, a bulk storage device, e.g., hard disk, or the like.

Accordingly, the flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

An IC includes a universal monitor system having a first detector circuit. The first detector circuit includes a start trigger circuit receiving first signals of an interconnect, wherein the start trigger circuit detects a start event for a transaction from the first signals, an end trigger circuit receiving second signals of the interconnect, wherein the end trigger circuit detects an end event for the transaction from second signals, and a latency circuit coupled to an output of the start trigger circuit and an output of the end trigger circuit. The first detector circuit also may include a data trigger circuit receiving third signals of the interconnect and detecting transferred data from the third signals. The first detector circuit further may include a first counter circuit coupled to an output of the latency circuit calculating a total latency, a second counter circuit coupled to an output of at least one of the start trigger circuit counting start events or the end trigger circuit counting end events, and a third counter circuit coupled to an output of the data trigger circuit counting a total amount of data transferred.

In one aspect, a trigger circuit includes at least one of the start trigger circuit or the end trigger circuit. The trigger circuit receives, from a host data processing system, an instruction specifying a different event including at least one of a different start event or a different end event. Responsive to the instruction, the trigger circuit detects the different event.

In another aspect, the latency circuit includes a memory having an input coupled to the output of the start trigger circuit and a difference circuit having a first input coupled to an output of the memory and a second input coupled to the output of the end trigger circuit. The start trigger circuit stores the time stamp of the start event in the memory. The difference circuit reads the time stamp of the start event from the memory, receives the time stamp of the end event from the end trigger circuit, and calculates a transaction latency using the time stamp of the start event and the time stamp of the end event.

In that case, the difference circuit may output a calculated transaction latency for each transaction. The first counter circuit increments by each calculated transaction latency.

In a further aspect, the start trigger circuit determines a transaction identifier for the start event and stores the transaction identifier in association with the time stamp of the start event in the memory. The end trigger circuit determines a transaction identifier for the end event. The difference circuit matches the transaction identifier of the end event with the transaction identifier of the start event when reading the time stamp of the start event from memory.

In still another aspect, the latency circuit includes a transaction counter having a first input coupled to an output of the start trigger circuit and a second input coupled to an output of the end trigger circuit. The transaction counter increments a count stored therein responsive to each detected start event and decrements the count responsive to each detected end event. The transaction counter outputs the count each clock cycle to the first counter circuit.

In that case, the first counter circuit is incremented each clock cycle by the count received from the transaction counter.

The first detector circuit may be dedicated to operating on a first type of transaction. The universal monitor system may include a second detector circuit dedicated to operating on a second and different type of transaction on the interconnect.

The universal monitor system may include a target controller coupled to the first detector circuit and receiving counter values from the first counter, the second counter, and the third counter. The target controller provides at least one of the counter values to a host data processing system coupled to the integrated circuit.

The target controller also may include a trace circuit for each universal monitor circuit coupled to the target controller. The trace circuit stores time stamps of start events, time stamps of end events, and time stamps of transferred data.

A method of monitoring an interconnect within an IC includes detecting start events for transactions on the interconnect using a first trigger circuit, detecting end events for the transactions using a second trigger circuit, and determining a total latency of transactions according to the detected start events and the detected end events. The method includes detecting transferred data segments on the interconnect using a third trigger circuit, determining an amount of data transferred according to the transferred data segments, and storing the amount of data transferred and the total latency within a plurality of memory mapped registers of a target controller.

In one aspect, determining a total latency may include, for each of a plurality of transactions, determining a transaction latency by calculating a difference between a start time stamp of a detected start event of a transaction and a time stamp of a detected end event for the transaction and incrementing a counter circuit by the transaction latency for each of the plurality of transactions.

In another aspect, determining a total latency includes incrementing a count stored within a first counter circuit responsive to each detected start event, decrementing the count stored within the first counter circuit responsive to each detected end event, and responsive to each clock cycle, incrementing a second counter circuit by the count stored within the first counter circuit.

The method may include storing time stamps of start events and time stamps of end events, chronologically ordering the start events and the stop events according to the time stamps for a plurality of different transactions occurring on a plurality of different interconnects, and sending the chronologically ordered start events and stop events to a host data processing system.

The method also may include sending start events and stop events for a plurality of different transactions occurring on a plurality of different interconnects to a host data processing system ordered on a per-interconnect basis.

An IC includes a universal monitor system. The universal monitor system includes a first detector circuit coupled to an interconnect. The first detector circuit includes a first plurality of circuit blocks that process events of transactions of a first type. The first plurality of circuit blocks include a first plurality of programmable event trigger circuits coupled to a first plurality of counters including a first total latency counter, a first number of transactions counter, and a first total bytes transferred counter. The universal monitor system includes a second detector circuit coupled to the interconnect. The second detector circuit includes a second plurality of circuit blocks that process events of transactions of a second type. The second plurality of circuit blocks include a second plurality of programmable event trigger circuits coupled to a second plurality of counters including a second total latency counter, a second number of transactions counter, and a second total bytes transferred counter.

In one aspect, the transactions of the first type are read transactions and the transactions of the second type are write transactions.

In another aspect, the first plurality of programmable event trigger circuits include a first start trigger circuit, a first end trigger circuit, and a first data trigger circuit. The second plurality of programmable event trigger circuits include a second start trigger circuit, a second end trigger circuit, and a second data trigger circuit.

The universal monitor system also may include a target controller coupled to the first detector circuit and the second detector circuit. The target controller may send data items generated by each of the first plurality of counters and the second plurality of counters to a host data processing system. The target controller also may receive instructions from the host data processing system that program the first plurality of programmable event trigger circuits and the second plurality of programmable event trigger circuits.

In another aspect, the target controller may include a plurality of memory mapped registers. The plurality of memory mapped registers may include a first subset of memory mapped registers storing the instructions from the host data processing system that specify, for each start event trigger circuit and each end event trigger circuit, each signal of the interconnect to be monitored and a state of the signal that triggers the start event and the end event. The plurality of memory mapped registers also may include a second subset of memory mapped registers storing the data items generated by each of the first plurality of counters and the second plurality of counters that are readable by the host data processing system.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. An integrated circuit comprising a universal monitor system having a first detector circuit, the first detector circuit comprising:
   a start trigger circuit receiving first signals of a first interconnect;
   wherein the start trigger circuit detects a start event for a transaction from the first signals;
   an end trigger circuit receiving second signals of the first interconnect;
   wherein the end trigger circuit detects an end event for the transaction from the second signals;
   a latency circuit coupled to an output of the start trigger circuit and an output of the end trigger circuit;
   a data trigger circuit receiving third signals of the first interconnect and detecting transferred data from the third signals;
   a first counter circuit coupled to an output of the latency circuit and calculating a total latency;
   a second counter circuit coupled to an output of at least one of the start trigger circuit and counting start events or the end trigger circuit and counting end events; and
   a third counter circuit coupled to an output of the data trigger circuit and counting a total amount of data transferred;
   wherein the integrated circuit is programmable and the first detector circuit is inserted within a user circuit design within the integrated circuit at a user specified insertion point corresponding to the first interconnect to monitor a circuit block of the user circuit design.

2. The integrated circuit of claim 1, wherein:
   at least one of the start trigger circuit or the end trigger circuit receives, from a host data processing system, an instruction specifying a different event comprising at least one of a different start event or a different end event; and
   responsive to the instruction, the at least one trigger circuit detects the different event, wherein the different event comprises different signals than previously monitored by the at least one of the start trigger circuit or the end trigger circuit.

3. The integrated circuit of claim 1, wherein the latency circuit comprises:
   a memory comprising an input coupled to the output of the start trigger circuit;
   a difference circuit comprising a first input coupled to an output of the memory and a second input coupled to the output of the end trigger circuit;
   wherein the start trigger circuit stores a time stamp of the start event in the memory; and
   wherein the difference circuit reads the time stamp of the start event from the memory, receives a time stamp of the end event from the end trigger circuit, and calculates a transaction latency using the time stamp of the start event and the time stamp of the end event.

4. The integrated circuit of claim 3, wherein the latency circuit maintains a count of outstanding transactions based upon start events and end events.

5. The integrated circuit of claim 3, wherein:
the difference circuit matches a transaction identifier of the end event with a transaction identifier of the start event when reading the time stamp of the start event from the memory.

6. The integrated circuit of claim 1, wherein the latency circuit comprises:
a transaction counter comprising a first input coupled to an output of the start trigger circuit and a second input coupled to an output of the end trigger circuit;
wherein the transaction counter increments a count stored therein responsive to each detected start event and decrements the count responsive to each detected end event; and
wherein the transaction counter outputs the count each clock cycle to the first counter circuit.

7. The integrated circuit of claim 6, wherein the first counter circuit is incremented each clock cycle by the count received from the transaction counter.

8. The integrated circuit of claim 1, wherein the universal monitor system further comprises:
a second detector circuit monitoring a second interconnect selected from the plurality of interconnects within the integrated circuit via a further user input;
wherein the second detector circuit is inserted within the user circuit design within the integrated circuit at a further user specified insertion point corresponding to the second interconnect to monitor a further circuit block of the user circuit design.

9. The integrated circuit of claim 1, wherein the universal monitor system further comprises:
a target controller coupled to the first detector circuit and receiving counter values from the first counter, the second counter, and the third counter;
wherein the target controller provides at least one of the counter values to a host data processing system coupled to the integrated circuit.

10. The integrated circuit of claim 9, wherein the target controller further comprises:
a trace circuit for each detector circuit coupled to the target controller;
wherein the trace circuit stores time stamps of start events, time stamps of end events, and time stamps of transferred data.

11. A method of monitoring an interconnect within an integrated circuit, the method comprising:
detecting start events for transactions on the interconnect using a first trigger circuit;
detecting end events for the transactions using a second trigger circuit;
determining a total latency of transactions according to the detected start events and the detected end events;
detecting transferred data segments on the interconnect using a third trigger circuit;
determining an amount of data transferred according to the transferred data segments; and
storing the amount of data transferred and the total latency within a plurality of memory mapped registers of a target controller;
wherein the start events and the end events are detected on each of a plurality of user selected interconnects coupling circuit blocks implemented within programmable circuitry of a programmable integrated circuit by detector circuits inserted within a user circuit design within the integrated circuit at user specified insertion points.

12. The method of claim 11, wherein the determining a total latency comprises:
for each of a plurality of transactions, determining a transaction latency by calculating a difference between a start time stamp of a detected start event of a transaction and a time stamp of a detected end event for the transaction;
incrementing a counter circuit by the transaction latency for each of the plurality of transactions.

13. The method of claim 11, further comprising:
determining a count of outstanding transactions based upon detected start events and detected end events.

14. The method of claim 11, further comprising:
storing time stamps of start events and time stamps of end events;
chronologically ordering the start events and the stop events according to the time stamps for a plurality of different transactions occurring on the plurality of different interconnects; and
sending the chronologically ordered start events and stop events to a host data processing system.

15. The method of claim 11, further comprising:
sending start events and stop events for a plurality of different transactions occurring on the plurality of different interconnects to a host data processing system ordered on a per-interconnect basis.

16. An integrated circuit comprising a universal monitor system, the universal monitor system comprising:
a first detector circuit coupled to an interconnect and comprising a first plurality of circuit blocks that process events of transactions of a first type;
wherein the first plurality of circuit blocks comprise a first plurality of programmable event trigger circuits coupled to a first plurality of counters comprising a first total latency counter, a first number of transactions counter, and a first total bytes transferred counter; and
a second detector circuit coupled to the interconnect and comprising a second plurality of circuit blocks that process events of transactions of a second type;
wherein the second plurality of circuit blocks comprise a second plurality of programmable event trigger circuits coupled to a second plurality of counters comprising a second total latency counter, a second number of transactions counter, and a second total bytes transferred counter;
wherein the integrated circuit is programmable and the first detector circuit and the second detector circuit are inserted within a user circuit design within the integrated circuit at user specified insertion points corresponding to the interconnect to monitor a circuit block of the user circuit design.

17. The integrated circuit of claim 16, wherein the transactions of the first type are read transactions and the transactions of the second type are write transactions.

18. The integrated circuit of claim 16, wherein the first detector circuit further comprises:
a latency circuit configured to maintain a count of outstanding transactions based upon detected start events and detected end events.

19. The integrated circuit of claim 16, wherein the universal monitor system further comprises:
a target controller coupled to the first detector circuit and the second detector circuit, wherein:

the target controller sends data items generated by each of the first plurality of counters and the second plurality of counters to a host data processing system; and the target controller receives instructions from the host data processing system that program the first plurality of programmable event trigger circuits and the second plurality of programmable event trigger circuits.

20. The integrated circuit of claim 16, wherein the universal monitor system further comprises:

a target controller coupled to the first detector circuit and the second detector circuit, wherein the target controller includes a trace circuit for each detector circuit coupled to the target controller;

wherein the trace circuit stores time stamps of start events, time stamps of end events, and time stamps of transferred data.

* * * * *